US012451176B2

(12) United States Patent
Cheon et al.

(10) Patent No.: US 12,451,176 B2
(45) Date of Patent: Oct. 21, 2025

(54) NONVOLATILE MEMORY DEVICE AND STORAGE DEVICE INCLUDING NONVOLATILE MEMORY DEVICE INCLUDING A VOLTAGE SELECTOR

(71) Applicant: Samsung Electronics Co., Ltd., Suwon-si (KR)

(72) Inventors: Euihyun Cheon, Suwon-si (KR); Sang-Wan Nam, Hwaseong-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 121 days.

(21) Appl. No.: 17/962,872

(22) Filed: Oct. 10, 2022

(65) Prior Publication Data

US 2023/0221870 A1    Jul. 13, 2023

(30) Foreign Application Priority Data

Jan. 13, 2022  (KR) .................. 10-2022-0005490
Apr. 29, 2022  (KR) .................. 10-2022-0053644

(51) Int. Cl.
*G11C 7/04*  (2006.01)
*G11C 5/06*  (2006.01)
*G11C 11/16*  (2006.01)

(52) U.S. Cl.
CPC .......... *G11C 11/1677* (2013.01); *G11C 5/063* (2013.01); *G11C 7/04* (2013.01); *G11C 11/1673* (2013.01)

(58) Field of Classification Search
CPC ....... G11C 11/1677; G11C 5/063; G11C 7/04; G11C 11/1673; G11C 2029/0411; G11C 11/5628; G11C 16/08; G11C 16/10; G11C 16/24; G11C 16/3418; G11C 16/3459; G11C 16/0483; G11C 16/30
See application file for complete search history.

(56) References Cited

U.S. PATENT DOCUMENTS 3,597,548 A  *  8/1971  Drinnan ............ H04Q 11/0407
                                                      370/372
7,272,048 B2     9/2007  Kang et al.
7,719,891 B2     5/2010  Lim
8,264,888 B2     9/2012  Choi et al.
(Continued)

FOREIGN PATENT DOCUMENTS

KR    10-2010-0091413 A    8/2010
KR       20150091665 A    8/2015

*Primary Examiner* — Khamdan N. Alrobaie
(74) *Attorney, Agent, or Firm* — Harness, Dickey & Pierce, P.L.C.

(57) ABSTRACT

Disclosed is a nonvolatile memory device including a memory cell array including memory cells, bit lines and word lines connected with the memory cells, a common source line connected with the memory cells, a control logic circuit including a common source line noise control logic circuit and configured to generate voltages including a first voltage and a second voltage, a voltage selector configured to receive the voltages and configured to select at least one of the voltages, and a common source line driver configured to receive the at least one selected voltage and configured to control a voltage of the common source line, and the common source line noise control logic circuit is configured to control the voltage selector based on program information so as to select the at least one of the voltages.

18 Claims, 9 Drawing Sheets

(56) References Cited

U.S. PATENT DOCUMENTS

| | | | |
|---|---|---|---|
| 8,446,769 B2 | 5/2013 | Kim | |
| 9,401,210 B2 | 7/2016 | Kwon et al. | |
| 9,401,213 B1 * | 7/2016 | Huang | G11C 16/24 |
| 10,360,983 B2 * | 7/2019 | Choi | G11C 16/3459 |
| 10,614,887 B2 | 4/2020 | Choi et al. | |
| 2011/0058427 A1 * | 3/2011 | Choi | G11C 16/10 |
| | | | 365/185.26 |
| 2011/0188310 A1 * | 8/2011 | Kim | G11C 16/04 |
| | | | 365/185.11 |
| 2015/0221376 A1 * | 8/2015 | Choi | G11C 16/0483 |
| | | | 365/185.11 |
| 2016/0343443 A1 * | 11/2016 | Choi | G11C 16/3459 |

* cited by examiner

NONVOLATILE MEMORY DEVICE AND STORAGE DEVICE INCLUDING NONVOLATILE MEMORY DEVICE INCLUDING A VOLTAGE SELECTOR

CROSS-REFERENCE TO RELATED APPLICATIONS

This application claims priority under 35 U.S.C. § 119 to Korean Patent Application Nos. 10-2022-0005490 filed on Jan. 13, 2022 and 10-2022-0053644 filed on Apr. 29, 2022, respectively, in the Korean Intellectual Property Office, the disclosures of which are incorporated by reference herein in their entireties.

BACKGROUND

Example embodiments of the present disclosure described herein relate to semiconductor memories, and more particularly, relate to nonvolatile memory devices and storage devices including the nonvolatile memory device.

A nonvolatile memory includes a read only memory (ROM), a programmable ROM (PROM), an electrically programmable ROM (EPROM), an electrically erasable and programmable ROM (EEPROM), a flash memory, a phase-change random access memory (PRAM), a magnetic RAM (MRAM), a resistive RAM (RRAM), a ferroelectric RAM (FRAM), etc.

As semiconductor manufacturing technologies develop, there is a continuous attempt to implement a nonvolatile memory with a three-dimensional structure. Compared with a two-dimensional structure, the three-dimensional structure may provide more memory cells in number in the same chip area. However, the nonvolatile memory of the three-dimensional structure requires the higher level of difficulty than the two-dimensional structure and causes unintended noises.

SUMMARY

Example embodiments of the present disclosure provide a nonvolatile memory device making a noise of a common source line uniform and a storage device including the nonvolatile memory device.

According to some example embodiments, a nonvolatile memory device may include a memory cell array that includes a plurality of memory cells, a plurality of bit lines and a plurality of word lines that are connected with the plurality of memory cells, a common source line that is connected with the plurality of memory cells, a control logic circuit that includes a common source line noise control logic circuit and is configured to generate a plurality of voltages including a first voltage and a second voltage, a voltage selector that is configured to receive the plurality of voltages and is configured to select at least one of the plurality of voltages, and a common source line driver that is configured to receive the at least one selected voltage and is configured to control a voltage of the common source line, and the common source line noise control logic circuit may be configured to control the voltage selector based on program information so as to select the at least one of the plurality of voltages.

According to some example embodiments, an operating method of a nonvolatile memory device may include generating, at a control logic circuit, a plurality of voltages including a first voltage and a second voltage, selecting, at a voltage selector, at least one of the plurality of voltages based on program information, and controlling, at a common source line driver, a voltage of a common source line based on the at least one selected voltage.

According to some example embodiments, a storage device may include a nonvolatile memory device, and a memory controller that is configured to control the nonvolatile memory device. The nonvolatile memory device may include a memory cell array that includes a plurality of cells, a plurality of bit lines and a plurality of word lines that are connected with the plurality of memory cells, a common source line that is connected with the plurality of memory cells, a control logic circuit that includes a common source line noise control logic circuit and is configured to generate a plurality of voltages including a first voltage and a second voltage, a voltage selector that is configured to receive the plurality of voltages and configured to select at least one of the plurality of voltages, and a common source line driver that is configured to receive the at least one selected voltage and is configured to control a voltage of the common source line, and the common source line noise control logic circuit may be configured to control the voltage selector based on program information so as to select the at least one of the plurality of voltages.

BRIEF DESCRIPTION OF THE FIGURES

The above and other objects and features of the present disclosure will become apparent by describing in detail embodiments thereof with reference to the accompanying drawings.

DETAILED DESCRIPTION

Below, example embodiments of the inventive concepts may be described in detail and clearly to such an extent that an ordinary one in the art easily implements the inventive concepts.

Figure 1:
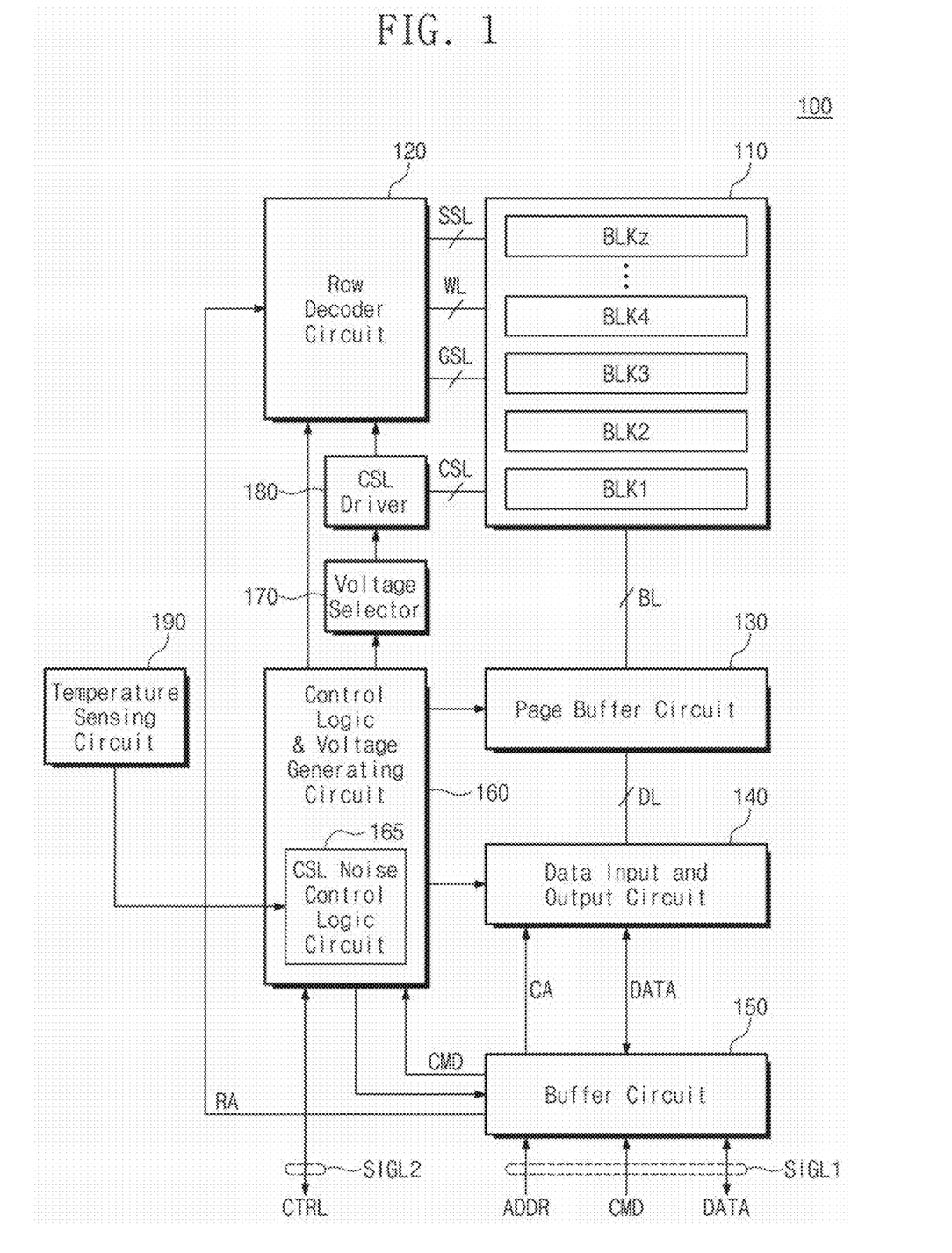
FIG. 1 is a block diagram illustrating a nonvolatile memory device according to some example embodiments of the present disclosure.

FIG. 1 is a block diagram illustrating a nonvolatile memory device according to some example embodiments of the present disclosure. Referring to FIG. 1, a nonvolatile memory device 100 includes a memory cell array 110, a row decoder circuit 120, a page buffer circuit 130, a data input and output circuit 140, a buffer circuit 150, a control logic and voltage generating circuit (hereinafter referred to as a "control logic circuit") 160, a voltage selector 170, a common source line driver 180, and a temperature sensing circuit 190.

The memory cell array 110 may include a plurality of memory blocks BLK1 to BLKz (z being a positive integer). Each of the memory blocks BLK1 to BLKz includes a plurality of memory cells. Each of the memory blocks BLK1 to BLKz may be connected with the row decoder circuit 120 through at least one ground selection line GSL, word lines WL, and at least one string selection line SSL. Some of the word lines WL may be used as dummy word lines. Each of the memory blocks BLK1 to BLKz may be connected with the page buffer circuit 130 through a plurality of bit lines BL. The memory blocks BLK1 to BLKz may be connected in common with the plurality of bit lines BL.

In some example embodiments, each of the memory blocks BLK1 to BLKz may be a unit of an erase operation. Memory cells belonging to each of the memory blocks BLK1 to BLKz may be erased at the same time. As another example, each of the memory blocks BLK1 to BLKz may be divided into a plurality of sub-blocks. Each of the sub-blocks may correspond to a unit of the erase operation.

The row decoder circuit 120 is connected with the memory cell array 110 through the ground selection lines GSL, the word lines WL, and the string selection lines SSL. The row decoder circuit 120 operates under control of the control logic circuit 160.

The row decoder circuit 120 may decode a row address RA received from the buffer circuit 150 and may control voltages to be applied to the string selection lines SSL, the word lines WL, and the ground selection lines GSL based on the decoded row address.

The page buffer circuit 130 is connected with the memory cell array 110 through the plurality of bit lines BL. The page buffer circuit 130 is connected with the data input and output circuit 140 through a plurality of data lines DL. The page buffer circuit 130 operates under control of the control logic circuit 160.

In a program operation, the page buffer circuit 130 may store data to be written in memory cells. The page buffer circuit 130 may apply voltages to the plurality of bit lines BL based on the stored data. In a read operation or in a verify read operation that is performed in a program operation or an erase operation, the page buffer circuit 130 may sense voltages of the bit lines BL and may store a result of the sensing.

The data input and output circuit 140 is connected with the page buffer circuit 130 through the plurality of data lines DL. The data input and output circuit 140 may receive a column address CA from the buffer circuit 150. The data input and output circuit 140 may output data read by the page buffer circuit 130 to the buffer circuit 150 depending on the column address CA. The data input and output circuit 140 may transfer data received from the buffer circuit 150 to the page buffer circuit 130, depending on the column address CA.

Through first signal lines SIGL1, the buffer circuit 150 may receive a command CMD and an address ADDR from an external device and may exchange data "DATA" with the external device. The buffer circuit 150 may operate under control of the control logic circuit 160. The buffer circuit 150 may transfer the command CMD to the control logic circuit 160. The buffer circuit 150 may transfer the row address RA of the address ADDR to the row decoder circuit 120 and may transfer the column address CA of the address ADDR to the data input and output circuit 140. The buffer circuit 150 may exchange the data "DATA" with the data input and output circuit 140.

The control logic circuit 160 may be configured to generate the following voltages necessary for the nonvolatile memory device 100 to operate a plurality of program voltages, a plurality of program verify voltages, a plurality of pass voltages, a plurality of read voltages, and a plurality of erase voltages.

The control logic circuit 160 may exchange a control signal CTRL with the external device through second signal lines SIGL2. The control logic circuit 160 may allow the buffer circuit 150 to route the command CMD, the address ADDR, and the data "DATA". The control logic circuit 160 may decode the command CMD received from the buffer circuit 150 and may control the nonvolatile memory device 100 depending on the decoded command.

The control logic circuit 160 may include a common source line noise control logic circuit 165. The common source line noise control logic circuit 165 may control the voltage selector 170. For example, the common source line noise control logic circuit 165 may allow the voltage selector 170 to select at least one of the plurality of voltages from the control logic circuit 160, based on program information. The common source line noise control logic circuit 165 may allow the voltage selector 170 to provide the selected voltage to the common source line driver 180.

As another example, the common source line noise control logic circuit 165 may allow the voltage selector 170 to change (or vary) the selected voltage to another voltage. In this case, the another voltage may include at least one of the remaining voltages of the plurality of voltages that the voltage selector 170 receives.

The common source line noise control logic circuit 165 may control the common source line driver 180. For example, the common source line noise control logic circuit 165 may control a transistor of the common source line driver 180. The common source line noise control logic circuit 165 may control the transistor of the common source line driver 180 so as to be turned on or turned off in response to the received voltage.

As another example, when the common source line driver 180 includes two or more transistors, the common source line noise control logic circuit 165 may independently control the transistors.

As another example, the common source line noise control logic circuit 165 may allow the common source line driver 180 to control a voltage of a common source line CSL.

The voltage selector 170 may be connected with the control logic circuit 160 and the common source line driver 180. The voltage selector 170 may receive the plurality of voltages from the control logic circuit 160.

The voltage selector 170 may operate under control of the common source line noise control logic circuit 165. For example, under control of the common source line noise control logic circuit 165, the voltage selector 170 may select at least one of the received voltages based on the program information and may provide the selected voltage to the common source line driver 180. In this case, the voltage selector 170 may select voltages as much as the number of transistors of the common source line driver 180.

As another example, the voltage selector 170 may change the selected voltage to another voltage under control of the common source line noise control logic circuit 165. In this case, the another voltage may include at least one of the remaining voltages of the plurality of voltages that the voltage selector 170 receives.

The common source line driver 180 may be connected with the voltage selector 170 and the common source line CSL. The common source line driver 180 may be configured to control the voltage of the common source line CSL or to provide a bias to the common source line CSL, under control of the control logic circuit 160. Alternatively, the common source line driver 180 may ground the common source line CSL.

The common source line driver 180 may receive at least one voltage from the voltage selector 170. The voltage that the common source line driver 180 receives may be a gate voltage of a transistor of the common source line driver 180.

The common source line driver 180 may include at least one transistor. The transistor of the common source line driver 180 may be turned on or turned off by the voltage received from the voltage selector 170 under control of the common source line noise control logic circuit 165. When the common source line driver 180 includes two or more transistors, the common source line driver 180 may control the transistors independently under control of the common source line noise control logic circuit 165.

The temperature sensing circuit 190 may be connected with the control logic circuit 160. The temperature sensing circuit 190 may sense a temperature of a peripheral part and may provide a sensing result to the common source line noise control logic circuit 165. In this case, the common source line noise control logic circuit 165 may allow the voltage selector 170 to select at least one of the received voltages based on the sensing result.

In some example embodiments, under control of the common source line noise control logic circuit 165, the voltage selector 170 may select at least one of the received voltages based on program information. The common source line driver 180 may receive the at least one voltage selected by the voltage selector 170. At least one transistor of the common source line driver 180 may be turned on or turned off by the voltage received under control of the common source line noise control logic circuit 165.

In some example embodiments, as the voltage selector 170 and the common source line driver 180 are controlled by the common source line noise control logic circuit 165, a channel resistance of the transistor of the common source line driver 180 may be changed, and thus, the noise of the common source line CSL may be adjusted to be uniform.

In some example embodiments, the nonvolatile memory device 100 may be manufactured in a bonding manner. The memory cell array 110 may be manufactured at a first wafer, and the row decoder circuit 120, the page buffer circuit 130, the data input and output circuit 140, the buffer circuit 150, and the control logic circuit 160 may be manufactured at a second wafer. The nonvolatile memory device 100 may be implemented by coupling the first wafer and the second wafer such that an upper surface of the first wafer and an upper surface of the second wafer face each other.

As another example, the nonvolatile memory device 100 may be manufactured in a cell over peri (COP) manner. A peripheral circuit including the row decoder circuit 120, the page buffer circuit 130, the data input and output circuit 140, the buffer circuit 150, the control logic circuit 160, the voltage selector 170, and the common source line driver 180 may be implemented on a substrate. The memory cell array 110 may be implemented over the peripheral circuit. The peripheral circuit and the memory cell array 110 may be connected by using through vias.

Figure 2:
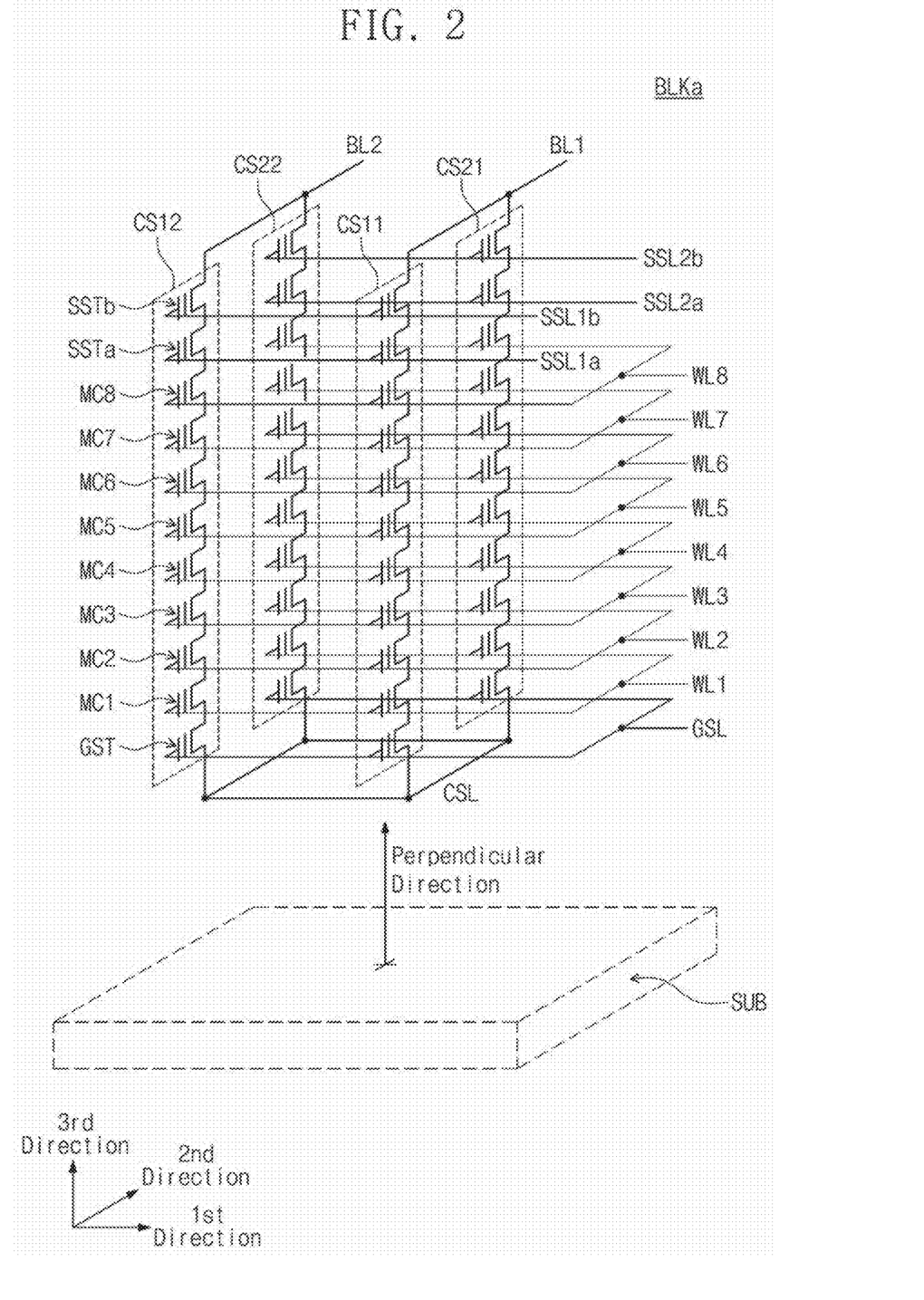
FIG. 2 is a circuit diagram illustrating an example of one memory block of memory blocks of FIG. 1.

FIG. 2 is a circuit diagram illustrating an example of one memory block BLKa of the memory blocks BLK1 to BLKz of FIG. 1. Referring to FIG. 2, a plurality of cell strings CS11, CS12, CS21, and CS22 may be arranged on a substrate SUB in rows and columns. Each row may extend in a first direction. Each column may extend in a second direction. The plurality of cell strings CS11, CS12, CS21, and CS22 may be connected in common with the common source line CSL formed on (or in) the substrate SUB. In FIG. 2, a location of the substrate SUB is depicted as an example for better understanding of the structure of the memory block BLKa. The substrate SUB may include a P-type semiconductor material. However, the present disclosure is not limited thereto.

Cell strings of each row may be connected in common with the ground selection line GSL and may be connected with corresponding string selection lines of first string selection lines SSL1a and SSL1b and second string selection lines SSL2a to SSL2b. Cell strings of each column may be connected with a corresponding bit line of first and second bit lines BL1 and BL2. For example, the first and second bit lines BL1 and BL2 may be included in a first bit line group BG1 of bit lines, a second bit line group BG2 of bit lines, or a third bit line group BG3 of the bit lines.

Each cell string may include at least one ground selection transistor GST connected with the ground selection line GSL, and a plurality of memory cells MC1 to MC8 respectively connected with a plurality of word lines WL1 to WL8. Cell strings of a first row may further include string selection transistors SSTa and SSTb respectively connected with the first string selection lines SSL1a and SSL1b. Cell strings of a second row may further include string selection transistors SSTa and SSTb respectively connected with the second string selection lines SSL2a and SSL2b.

In each cell string, the ground selection transistor GST, the memory cells MC1 to MC8, and the string selection transistors SSTa and SSTb may be connected in series in a direction perpendicular to the substrate SUB, for example, a third direction and may be sequentially stacked in the direction perpendicular to the substrate SUB. In each of the cell strings CS11, CS12, CS21, and CS22, at least one of the memory cells MC1 to MC8 may be used as a dummy memory cell. The dummy memory cell may not be programmed (e.g., may be program-inhibited) or may be programmed differently from the remaining memory cells of the memory cells MC1 to MC8 other than the dummy memory cell.

In some example embodiments, memory cells that are placed at the same height and are associated with one string selection line SSL1a, SSL1b, SSL2a, or SSL2b may form one physical page. Memory cells constituting one physical page may be connected with one sub-word line. Sub-word lines of physical pages located at the same height may be connected in common with one word line. Below the term "word line" may be used to indicate a word line or a sub-word line and may be interpreted based on the context.

When a current flows to the common source line CSL, a common source line voltage VCSL may change due to a resistance existing in the common source line CSL. Herein, the common source line voltage VCSL is proportional to a cell current due to on-cells. For example, as the number of on-cells of memory cells connected with a selected word line increases, the amount of current flowing to the common source line CSL may increase; in this case, the common source line voltage VCSL may increase. The change in the common source line voltage VCSL acts as a noise voltage (hereinafter referred to as a "noise") existing in the common source line CSL.

Figure 3:
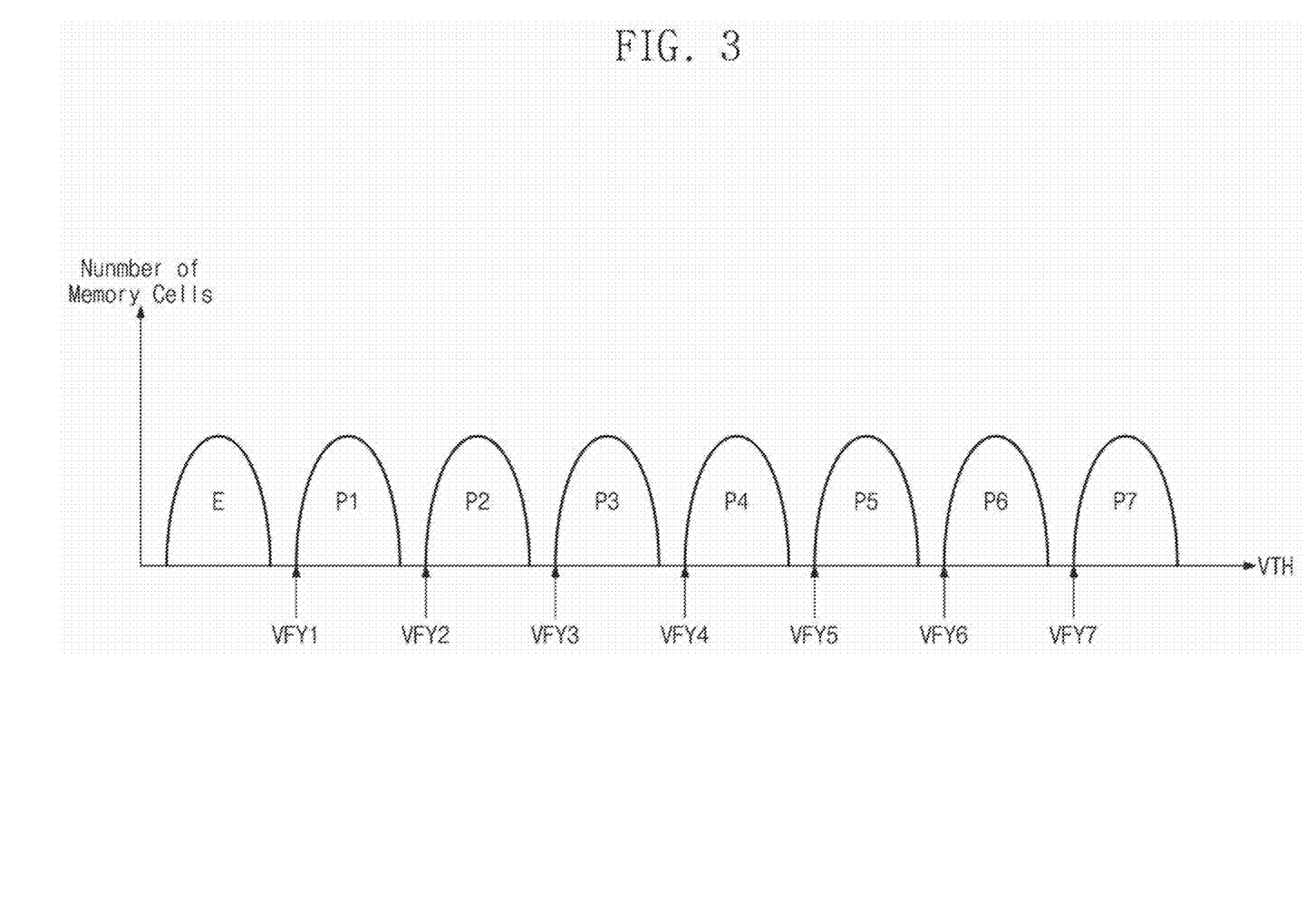
FIG. 3 illustrates an example in which a nonvolatile memory device performs a program operation in response to a program command.

FIG. 3 illustrates an example in which a nonvolatile memory device performs a program operation in response to a program command. In FIG. 3, a horizontal axis represents a threshold voltage VTH of a memory cell, and a vertical axis represents the number of memory cells.

Referring to FIGS. 1 to 3, the nonvolatile memory device 100 may program memory cells of an erase state "E" to first to seventh program states P1 to P7. The nonvolatile memory device 100 may program the memory cells to the first to seventh program states P1 to P7 by using first to seventh verify voltages VFY1 to VFY7.

In the program operation, each memory cell may maintain the erase state "E" or may be programmed to have a threshold voltage included in one of the first to seventh program states P1 to P7. A program state may indicate a range of threshold voltages of memory cells. For example, memory cells to be programmed to the first program state P1 may be programmed to have a threshold voltage included in a threshold voltage range marked by the first program state P1. Likewise, memory cells to be programmed to the second to seventh program states P2 to P7 may be programmed to have threshold voltages included in threshold voltage ranges respectively marked by the second to seventh program states P2 to P7.

Figure 4:
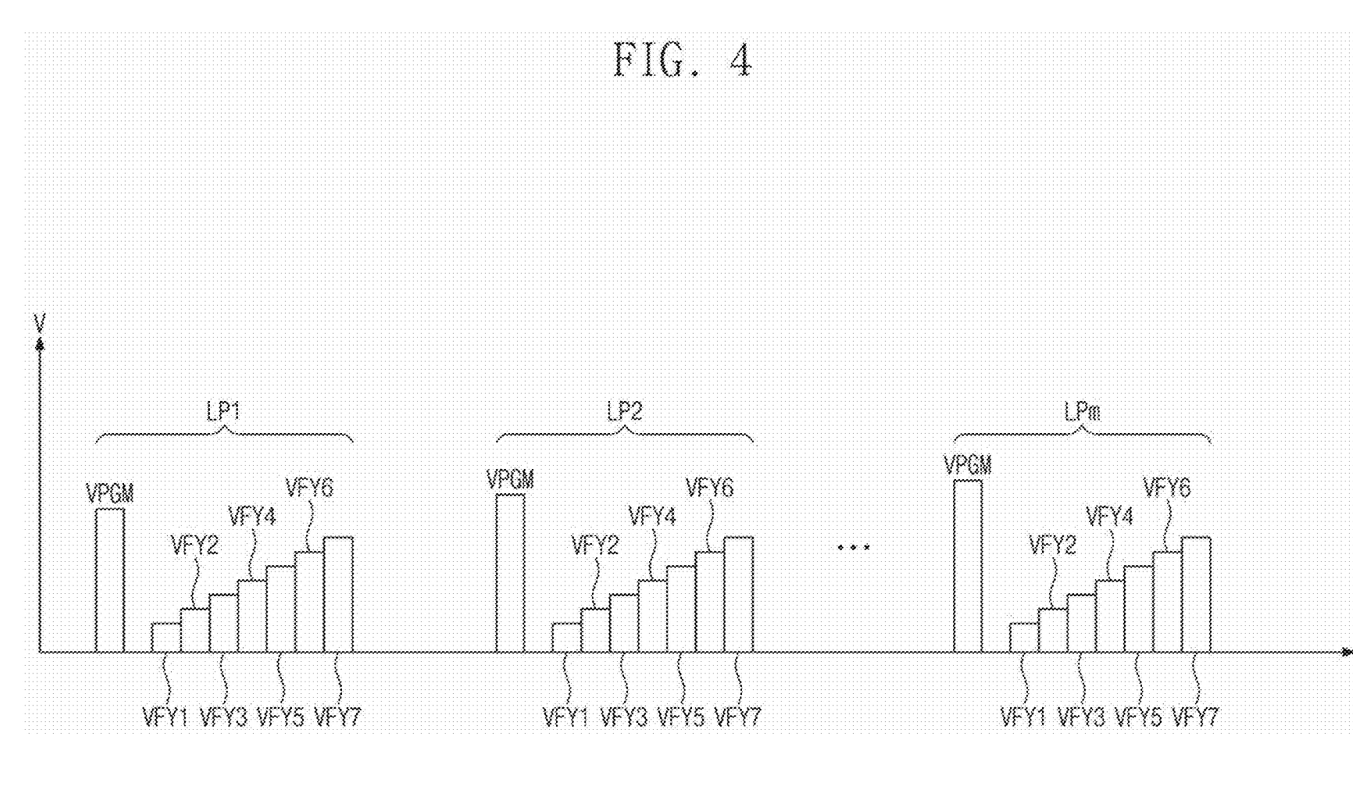
FIG. 4 illustrates an example in which a nonvolatile memory device performs program loops of a program operation in response to a program command.

FIG. 4 illustrates an example in which a nonvolatile memory device performs program loops of a program operation in response to a program command. In FIG. 4, a horizontal axis represents a time "T", and a vertical axis represents a voltage "V" applied to a selected word line.

Referring to FIGS. 1, 3, and 4, in the program operation, the nonvolatile memory device 100 may perform first to m-th program loops LP1 to LPm (m being a positive integer). Each of the first to m-th program loops LP1 to LPm may include a program step of applying a program voltage VPGM and a verify step of applying the first to seventh verify voltages VFY1 to VFY7. Threshold voltages of memory cells of a selected word line (e.g., a selected sub-word line) may increase by applying the program voltage VPGM. The verify read operation may be performed by applying the first to seventh verify voltages VFY1 to VFY7. For example, when a threshold voltage of a memory cell to be programmed to the first program state P1 is smaller than the first verify voltage VFY1, the corresponding memory cell may be determined as the program fail. When the threshold voltage of the memory cell to be programmed to the first program state P1 is greater than the first verify voltage VFY1, the corresponding memory cell may be program-inhibited. Likewise, the nonvolatile memory device 100 may program the memory cells to the second to seventh program states P2 to P7 by using the second to seventh verify voltages VFY2 to VFY7.

As a program loop progresses (or is repeated), a level of the program voltage VPGM may increase. In an initial program loop such as the first program loop LP1, some of the first to seventh verify voltages VFY1 to VFY7, for example, some verify voltages, which are higher than the remaining verify voltages, such as the seventh verify voltage VFY7 may not be applied. As a program loop progresses (or is repeated), a program state(s), the threshold voltage range(s) of which is lower than that of the remaining program states, such as the first program state P1 may be program-passed prior to the remaining program states. A verify voltage (e.g., the first verify voltage VFY1) corresponding to a program state first program-passed from among the first to seventh verify voltages VFY1 to VFY7 may not be applied any longer.

Figure 5A:
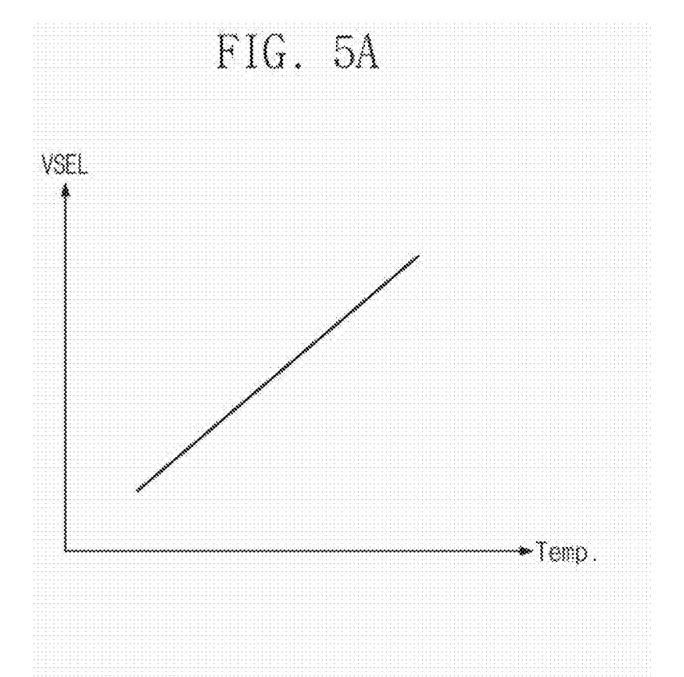
FIGS. 5A to 5C are diagrams for describing an operation of a nonvolatile memory device of FIG. 1.
Figure 5B:
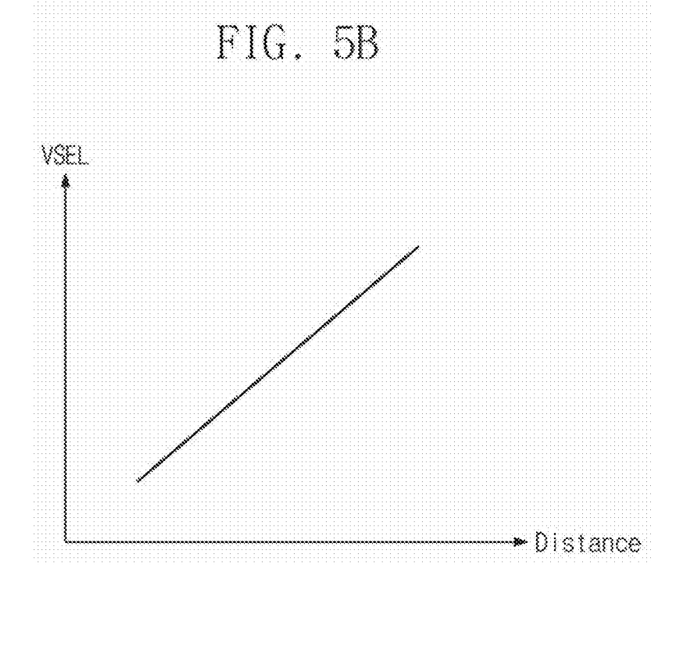
Figure 5C:
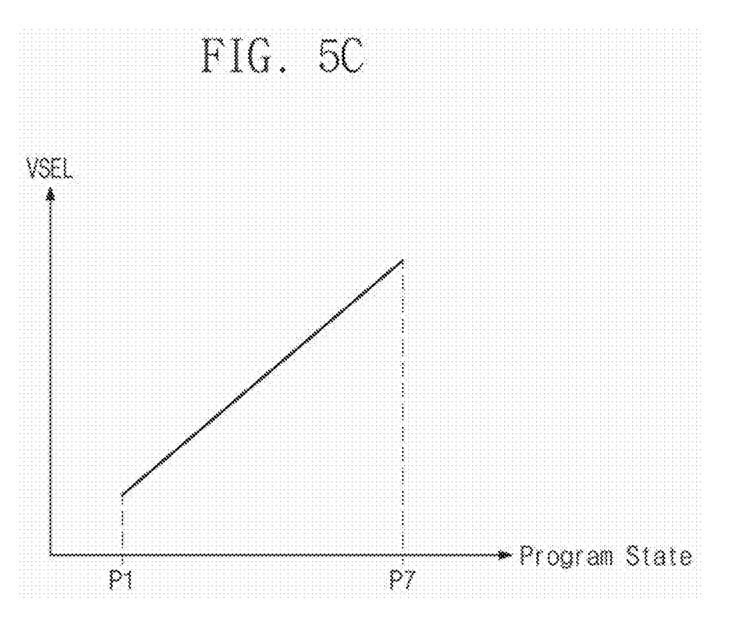

FIGS. 5A to 5C are diagrams for describing an operation of the nonvolatile memory device 100 of FIG. 1. In FIG. 5A, a horizontal axis represents a temperature, and a vertical axis represents a voltage VSEL selected from the voltage selector 170. In FIG. 5B, a horizontal axis represents a distance from the common source line driver 180 to a cell string indicated by the address ADDR received from the external device, and a vertical axis represents the voltage VSEL selected from the voltage selector 170. In FIG. 5C, a horizontal axis represents a program state of a memory cell, and a vertical axis represents the voltage VSEL selected from the voltage selector 170.

Referring to FIGS. 1 and 5A, the temperature sensing circuit 190 may sense a temperature of a peripheral part and may provide a sensing result signal to the common source line noise control logic circuit 165. The common source line noise control logic circuit 165 may allow the voltage selector 170 to select at least one of the received voltages based on the sensing result.

The resistance of the common source line CSL when the temperature of the peripheral part is low (e.g., corresponds to a cold temperature) may be smaller than the resistance of the common source line CSL when the temperature of the peripheral part is high (e.g., corresponds to a hot temperature), and thus, the voltage VSEL selected from the voltage selector 170 may decrease. In other words, as a temperature increases, the resistance of the common source line CSL may increase.

The resistance of the common source line CSL when the temperature of the peripheral part is high (e.g., corresponds to a hot temperature) may be greater than the resistance of the common source line CSL when the temperature of the peripheral part is low (e.g., corresponds to a cold temperature), and thus, the voltage VSEL selected from the voltage selector 170 may increase.

Referring to FIGS. 1 and 5B, the resistance of the common source line CSL when the address ADDR received from the external device indicates a cell string close to the common source line driver 180 may be smaller than the resistance of the common source line CSL when the address ADDR received from the external device indicates a cell string distant from the common source line driver 180, and thus, the voltage VSEL selected from the voltage selector 170 may decrease. In other words, as a distance from the common source line driver CSL increases, the resistance of the common source line CSL may increase.

The resistance of the common source line CSL when the address ADDR received from the external device indicates a cell string distant from the common source line driver 180 may be greater than the resistance of the common source line CSL when the address ADDR received from the external device indicates a cell string close to the common source line driver 180, and thus, the voltage VSEL selected from the voltage selector 170 may increase.

Referring to FIGS. 1, 3, and 5C, the threshold voltage distribution of memory cells when the memory cells are programmed to the first program state P1 is lower than the threshold voltage distribution of the memory cells when the memory cells are programmed to the seventh program state P7, and thus, the voltage VSEL selected from the voltage selector 170 may decrease.

The threshold voltage distribution of memory cells when the memory cells are programmed to the seventh program state P7 is higher than the threshold voltage distribution of the memory cells when the memory cells are programmed to the first program state P1, and thus, the voltage VSEL selected from the voltage selector 170 may increase.

Figure 6:
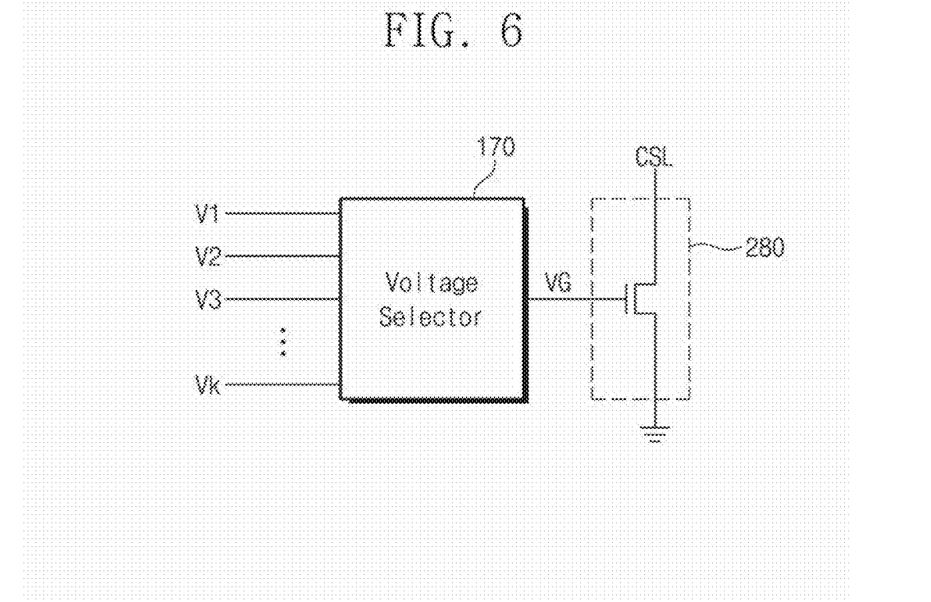
FIG. 6 illustrates an example of a common source line driver according to some example embodiments of the present disclosure.

FIG. 6 illustrates an example of a common source line driver 280 according to some example embodiments of the present disclosure. Referring to FIGS. 1 and 6, the voltage selector 170 may receive a plurality of voltages V1 to Vk (k being a positive integer), and the common source line driver 180 may include a transistor.

Under control of the common source line noise control logic circuit 165, the voltage selector 170 may select one of the received voltages V1 to Vk based on program information. In this case, the program information may include a temperature, the address ADDR received from the external device, a program state, etc. The voltage selector 170 may provide the selected voltages as a gate voltage VG of the transistor of the common source line driver 280.

The transistor of the common source line driver 280 may receive a voltage that the voltage selector 170 selects. The common source line driver 280 may control the voltage of the common source line CSL in response to the received voltage, under control of the common source line noise control logic circuit 165. As the common source line CSL is controlled by the common source line driver 280, the noise of the common source line CSL may be adjusted to be uniform.

Figure 7:
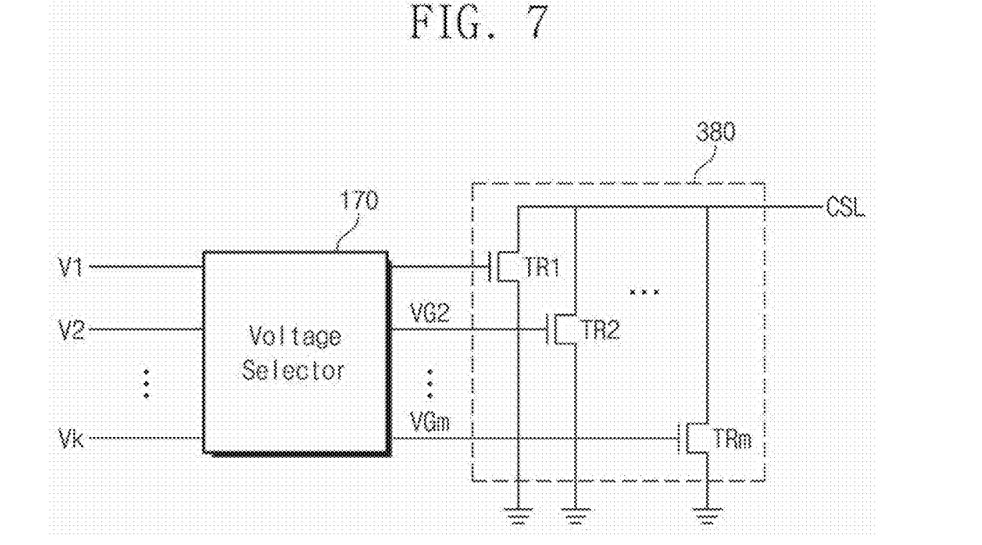
FIG. 7 illustrates an example of a common source line driver according to some example embodiments of the present disclosure.

FIG. 7 illustrates an example of a common source line driver 380 according to some example embodiments of the present disclosure. Referring to FIGS. 1 and 7, the voltage selector 170 may receive the plurality of voltages V1 to Vk (k being a positive integer), and the common source line driver 380 may include a plurality of transistors TR1 to TRm (m being a positive integer less than k). In this case, the common source line driver 380 may independently control the transistors TR1 to TRm under control of the common source line noise control logic circuit 165.

Under control of the common source line noise control logic circuit 165, the voltage selector 170 may select "m" voltages of the received voltages V1 to Vk based on program information. The selected "m" voltages may have the same values or different values. In this case, the program information may include a temperature, the address ADDR received from the external device, a program state, etc. The voltage selector 170 may provide the selected "m" voltages as gate voltages VG1 to VGm of the transistors TR1 to TRm of the common source line driver 380, respectively.

The transistors TR1 to TRm of the common source line driver 380 may respectively receive the "m" voltages that the voltage selector 170 selects. Under control of the common source line noise control logic circuit 165, the transistors TR1 to TRm of the common source line driver 380 may be respectively turned on or turned off by the received voltages.

The common source line driver 380 may control the voltage of the common source line CSL under control of the common source line noise control logic circuit 165. As the common source line CSL is controlled by the common source line driver 380, the noise of the common source line CSL may be adjusted to be uniform.

Figure 8:
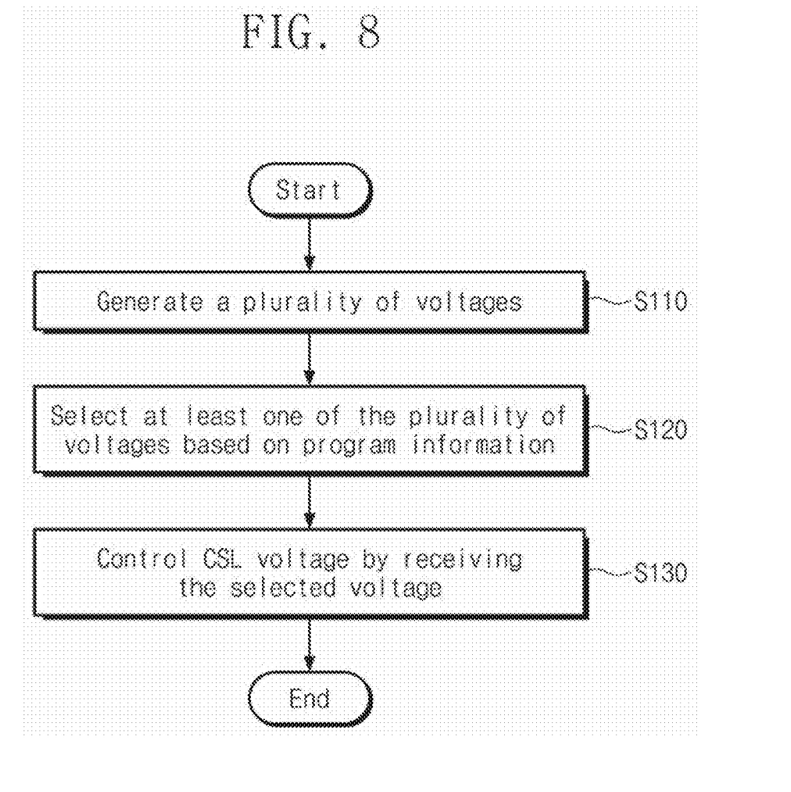
FIG. 8 is a flowchart illustrating an operation of a nonvolatile memory device according to some example embodiments of the present disclosure.

FIG. 8 is a flowchart illustrating an operation of the nonvolatile memory device 100 according to some example embodiments of the present disclosure.

Referring to FIGS. 5, 6, and 8, in operation S110, the control logic circuit 160 may generate a plurality of voltages. The control logic circuit 160 may provide the voltage selector 170 with the plurality of voltages thus generated.

In operation S120, the voltage selector 170 may select at least one of the received voltages based on program information. The voltage selector 170 may provide the selected voltage to a common source line driver.

For example, under control of the common source line noise control logic circuit 165, the voltage selector 170 may select one of the received voltages V1 to Vk based on the program information. The voltage selector 170 may provide the selected voltage as the gate voltage VG of the transistor of the common source line driver 280.

As another example, under control of the common source line noise control logic circuit 165, the voltage selector 170 may select "m" voltages from the received voltages V1 to Vk based on the program information. The voltage selector 170 may provide the selected "m" voltages as the gate voltages VG1 to VGm of the transistors TR1 to TRm of the common source line driver 380, respectively.

In operation S130, the common source line driver may receive the selected voltage and may control a voltage of the common source line CSL. For example, the transistor of the common source line driver 280 may receive a voltage that the voltage selector 170 selects. The common source line driver 280 may control the voltage of the common source line CSL in response to the received voltage, under control of the common source line noise control logic circuit 165.

As another example, the transistors TR1 to TRm of the common source line driver 380 may respectively receive the "m" voltages that the voltage selector 170 selects. The common source line driver 380 may control the voltage of the common source line CSL in response to the received voltages, under control of the common source line noise control logic circuit 165.

In some example embodiments, as the common source line CSL is controlled by the common source line driver, the noise of the common source line CSL may be adjusted to be uniform.

Figure 9:
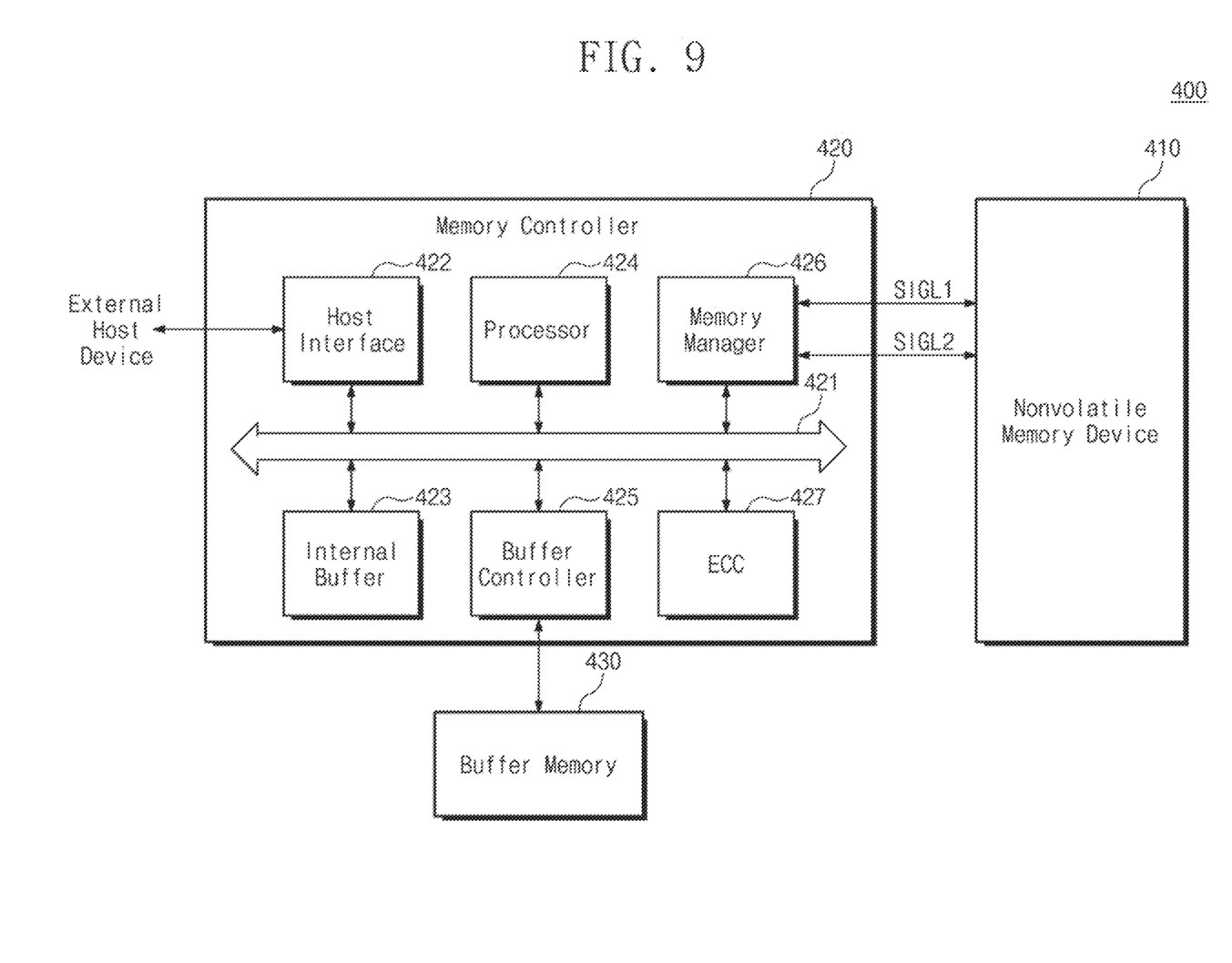
FIG. 9 is a block diagram illustrating a storage device including a nonvolatile memory device according to some example embodiments of the present disclosure.

FIG. 9 is a block diagram illustrating a storage device 400 including a nonvolatile memory device according to some example embodiments of the present disclosure. Referring to FIG. 9, the storage device 400 may include a nonvolatile memory device 410, a memory controller 420, and an external buffer 430. The nonvolatile memory device 410 may include a plurality of memory cells. Each of the plurality of memory cells may store two or more bits.

For example, the nonvolatile memory device 410 may include at least one of various nonvolatile memory devices such as a flash memory device, a phase change memory device, a ferroelectric memory device, a magnetic memory device, and a resistive memory device. The nonvolatile memory device 410 may include the nonvolatile memory device 100 described with reference to FIGS. 1 to 8.

The memory controller 420 may receive, from the external host device, various requests for writing data in the nonvolatile memory device 410 or reading data from the nonvolatile memory device 410. The memory controller 420 may store (or buffer) user data, which are transmitted/received to/from the external host device, in the external buffer 430 and may store metadata for managing the storage device 400 in the external buffer 430.

The memory controller 420 may access the nonvolatile memory device 410 through first signal lines SIGL1 and second signal lines SIGL2. For example, the memory controller 420 may transmit a command and an address to the nonvolatile memory device 410 through the first signal lines SIGL1. The memory controller 420 may exchange data with the nonvolatile memory device 410 through the first signal lines SIGL1.

The memory controller 420 may transmit a first control signal to the nonvolatile memory device 410 through the second signal lines SIGL2. The memory controller 420 may receive a second control signal from the nonvolatile memory device 410 through the second signal lines SIGL2.

In some example embodiments, the memory controller 420 may be configured to control two or more nonvolatile memory devices. The memory controller 420 may provide first signal lines and second signal lines for each of the two or more nonvolatile memory devices.

As another example, the memory controller 420 may be configured such that two or more nonvolatile memory devices share one first signal line. The memory controller 420 may be configured such that the two or more nonvolatile memory devices share some of the second signal lines and the others thereof are separately provided.

The external buffer 430 may include a random access memory. For example, the external buffer 430 may include at least one of a dynamic random access memory, a phase change random access memory, a ferroelectric random access memory, a magnetic random access memory, and a resistive random access memory.

The memory controller 420 may include a bus 421, a host interface 422, an internal buffer 423, a processor 424, a buffer controller 425, a memory manager 426, and an error correction code (ECC) block 427.

The bus 421 may provide communication channels between the components in the memory controller 420. The host interface 422 may receive various requests from the external host device and may parse the received requests. The host interface 422 may store the parsed requests in the internal buffer 423.

The host interface 422 may transfer various responses to the external host device. The host interface 422 may exchange signals with the external host device in compliance with a given communication protocol. The internal buffer 423 may include a random access memory. For example, the internal buffer 423 may include a static random access memory or a dynamic random access memory.

The processor 424 may drive an operating system or firmware for an operation of the memory controller 420. The processor 424 may read the parsed requests stored in the internal buffer 423 and may generate commands and addresses for controlling the nonvolatile memory device 410. The processor 424 may provide the generated commands and addresses to the memory manager 426.

The processor 424 may store various metadata for managing the storage device 400 in the internal buffer 423. The processor 424 may access the external buffer 430 through the buffer controller 425. The processor 424 may control the buffer controller 425 and the memory manager 426 such that user data stored in the external buffer 430 are provided to the nonvolatile memory device 410.

The processor 424 may control the host interface 422 and the buffer controller 425 such that the data stored in the external buffer 430 are provided to the external host device. The processor 424 may control the buffer controller 425 and the memory manager 426 such that data received from the nonvolatile memory device 410 are stored in the external buffer 430. The processor 424 may control the host interface 422 and the buffer controller 425 such that data received from the external host device are stored in the external buffer 430.

Under control of the processor 424, the buffer controller 425 may write data in the external buffer 430 or may read data from the external buffer 430. The memory manager 426 may communicate with the nonvolatile memory device 410 through the first signal lines SIGL1 and the second signal lines SIGL2 under control of the processor 424.

The memory manager 426 may access the nonvolatile memory device 410 under control of the processor 424. For example, the memory manager 426 may access the nonvolatile memory device 410 through the first signal lines SIGL1 and the second signal lines SIGL2. The memory manager 426 may communicate with the nonvolatile memory device 410, based on a protocol that is defined in compliance with the standard or is defined by a manufacturer.

The error correction code block 427 may perform error correction encoding on data to be provided to the nonvolatile memory device 410 by using an error correction code (ECC). The error correction code block 427 may perform error correction decoding on data received from the nonvolatile memory device 410 by using the error correction code (ECC).

In some example embodiments, the storage device 400 may not include the external buffer 430 and the buffer controller 425. When the external buffer 430 and the buffer controller 425 are not included in the storage device 400, the above functions of the external buffer 430 and the buffer controller 425 may be performed by the internal buffer 423.

In some example embodiments, components according to the present disclosure are described by using the terms "first", "second", "third", etc. However, the terms "first", "second", "third", etc. may be used to distinguish components from each other and do not limit the present disclosure. For example, the terms "first", "second", "third", etc. do not involve an order or a numerical meaning of any form.

According to the present disclosure, as a voltage of a common source line is controlled, a noise of a common source line may be adjusted to be uniform. Accordingly, a nonvolatile memory device with improved performance and reliability and a storage device including the nonvolatile memory device are provided.

The memory device 100 (or other circuitry, for example, the row decoder circuit 120, the page buffer circuit 130, the data input and output circuit 140, the buffer circuit 150, the control logic circuit 160, the voltage selector 170, the common source line driver 180, the temperature sensing circuit 190, storage device 400 and subcomponents) may include hardware including logic circuits; a hardware/software combination such as a processor executing software; or a combination thereof. For example, the processing circuitry more specifically may include, but is not limited to, a central processing unit (CPU), an arithmetic logic unit (ALU), a digital signal processor, a microcomputer, a field programmable gate array (FPGA), a System-on-Chip (SoC), a programmable logic unit, a microprocessor, application-specific integrated circuit (ASIC), etc.

While the present disclosure has been described with reference to embodiments thereof, it will be apparent to those of ordinary skill in the art that various changes and modifications may be made thereto without departing from the spirit and scope of the present disclosure as set forth in the following claims.

What is claimed is:
1. A nonvolatile memory device comprising:
a memory cell array including a plurality of memory cells;
a plurality of bit lines and a plurality of word lines connected with the plurality of memory cells;
a common source line connected with the plurality of memory cells;
a control logic circuit including a common source line noise control logic circuit, and configured to generate a plurality of voltages including a first voltage and a second voltage;

a voltage selector configured to receive the plurality of voltages and to select at least one of the plurality of voltages; and a common source line driver configured to receive the at least one selected voltage and to control a voltage of the common source line, wherein the common source line noise control logic circuit is configured to control the voltage selector based on program information so as to select the at least one of the plurality of voltages, the common source line driver includes a first transistor, and the voltage selector is configured to select the first voltage as a gate voltage of the first transistor.

2. The nonvolatile memory device of claim 1, further comprising:

a temperature sensing circuit configured to sense a temperature of a peripheral part and to transfer the sensing result to the control logic circuit, wherein the program information includes the temperature of the peripheral part.

3. The nonvolatile memory device of claim 2, wherein, as the temperature of the peripheral part decreases, the at least one selected voltage decreases.

4. The nonvolatile memory device of claim 2, wherein, as the temperature of the peripheral part increases, the at least one selected voltage increases.

5. The nonvolatile memory device of claim 1, wherein the program information includes an address received from an external device.

6. The nonvolatile memory device of claim 5, wherein, as a cell string indicated by the address becomes closer to the common source line driver, the at least one selected voltage decreases.

7. The nonvolatile memory device of claim 5, wherein, as a cell string indicated by the address becomes farther from the common source line driver, the at least one selected voltage increases.

8. The nonvolatile memory device of claim 1, wherein the program information includes a program state.

9. The nonvolatile memory device of claim 8, wherein, as a threshold voltage range of the program state decreases, the at least one selected voltage decreases.

10. The nonvolatile memory device of claim 8, wherein, as a threshold voltage range of the program state increases, the at least one selected voltage increases.

11. The nonvolatile memory device of claim 1, wherein the common source line driver includes a second transistor, and the voltage selector is configured to select the second voltage as a gate voltage of the second transistor.

12. The nonvolatile memory device of claim 11, wherein the first voltage turns on or turns off the first transistor, and the second voltage turns on or turns off the second transistor.

13. An operating method of a nonvolatile memory device, the method comprising:

generating, at a control logic circuit, a plurality of voltages including a first voltage and a second voltage;

selecting, at a voltage selector, at least one of the plurality of voltages based on program information; and controlling, at a common source line driver, a voltage of a common source line based on the at least one selected voltage, the common source line driver includes a first transistor, and the selecting of the at least one of the plurality of voltages at the voltage selector includes selecting the first voltage as a gate voltage of the first transistor.

14. The method of claim 13, further comprising:

changing, at the voltage selector, the first voltage to the second voltage.

15. The method of claim 13, wherein the common source line driver includes a second transistor, and the selecting of the at least one of the plurality of voltages at the voltage selector includes selecting, at the voltage selector, the second voltage as a gate voltage of the second transistor.

16. The method of claim 15, wherein the first voltage turns on or turns off the first transistor, and the second voltage turns on or turns off the second transistor.

17. The method of claim 13, wherein the program information includes one of a temperature, an address received from an external device, or a program state.

18. A storage device comprising:

a nonvolatile memory device; and a memory controller configured to control the nonvolatile memory device, the nonvolatile memory device includes:

a memory cell array including a plurality of memory cells;

a plurality of bit lines and a plurality of word lines connected with the plurality of memory cells;

a common source line connected with the plurality of memory cells;

a control logic circuit including a common source line noise control logic circuit, the control logic circuit configured to generate a plurality of voltages including a first voltage and a second voltage;

a voltage selector configured to receive the plurality of voltages and to select at least one of the plurality of voltages; and a common source line driver configured to receive the at least one selected voltage and to control a voltage of the common source line, the common source line driver including a first transistor, wherein the common source line noise control logic circuit is configured to control the voltage selector based on program information so as to select the at least one of the plurality of voltages as a gate voltage of the first transistor.

* * * * *